4 Sheets—Sheet 1.

W. L. REYNOLDS & D. THOMAS,

Assignors of one-third interest to W. B. DEAN.

Puddling-Furnace.

No. 9,139. Reissued April 6, 1880.

ATTEST.

Fred L. Lear

Paul Bakewell

INVENTOR.

William L. Reynolds.

David Thomas.

by Chas. D. Moody, atty.

N. PETERS, PHOTO-LITHOGRAPHER, WASHINGTON, D. C.

4 Sheets—Sheet 2.

W. L. REYNOLDS & D. THOMAS,

Assignors of one-third interest to W. B. DEAN,

Puddling-Furnace.

No. 9,139. Reissued April 6, 1880.

ATTEST.

Fred L. Lear

Paul Bakewell

INVENTORS.

William L. Reynolds.

David Thomas by Chas. D. Moody atty.

N. PETERS, PHOTO-LITHOGRAPHER, WASHINGTON, D. C.

4 Sheets—Sheet 3.

W. L. REYNOLDS & D. THOMAS,

Assignors of one-third interest to W. B. DEAN.

Puddling-Furnace.

No. 9,139. Reissued April 6, 1880.

ATTEST.

Fred K. Lear
Paul Bakewell

INVENTORS.

William L. Reynolds.
David Thomas.
by Chas. D. Moody
atty.

N. PETERS, PHOTO-LITHOGRAPHER, WASHINGTON, D. C.

4 Sheets—Sheet 4.
W. L. REYNOLDS & D. THOMAS,
Assignors of one-third interest to W. B. DEAN.
Puddling-Furnace.
No. 9,139. Reissued April 6, 1880.
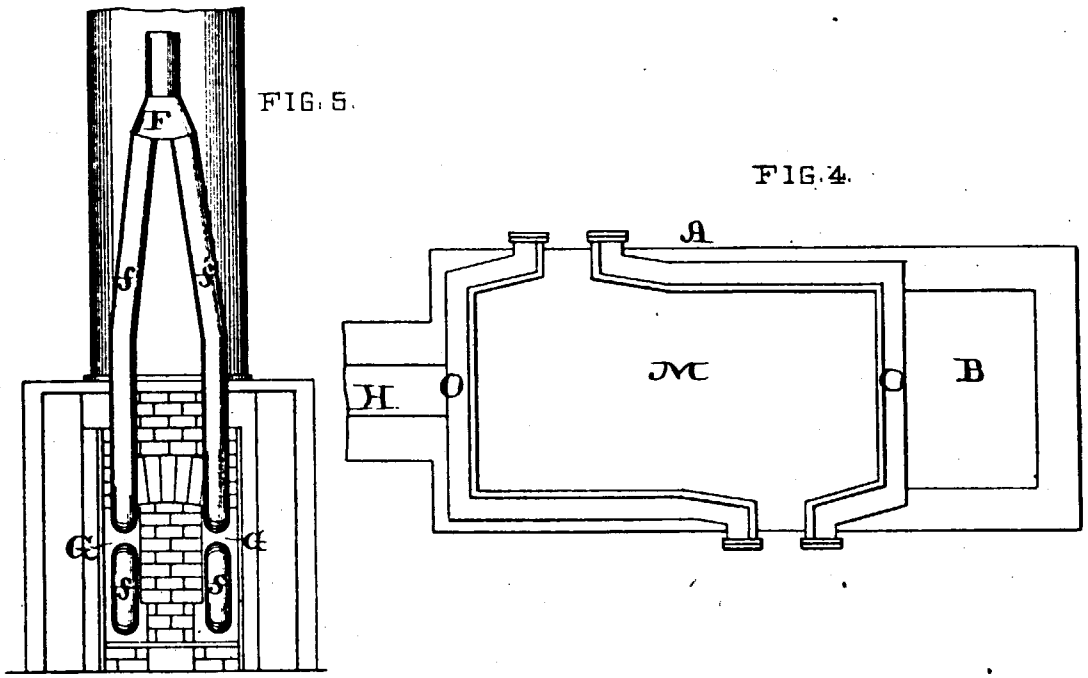
ATTEST.
Fred K. Lear
Paul Bakewell
INVENTORS.
William L. Reynolds.
David Thomas.
by Chas. D. Moody.
atty.
N. PETERS, PHOTO-LITHOGRAPHER, WASHINGTON, D. C.

UNITED STATES PATENT OFFICE.

WILLIAM L. REYNOLDS AND DAVID THOMAS, OF ST. LOUIS, MISSOURI, ASSIGNORS OF ONE-THIRD INTEREST TO WILLIAM B. DEAN.

PUDDLING-FURNACE.

SPECIFICATION forming part of Reissued Letters Patent No. 9,139, dated April 6, 1880.

Original No. 174,573, dated March 7, 1876. Application for reissue filed October 5, 1877.

*To all whom it may concern:*

Be it known that we, WILLIAM L. REYNOLDS and DAVID THOMAS, residents of St. Louis, State of Missouri, have invented new and useful Improvements in Puddling-Furnaces, of which the following is a full, clear, and exact description, reference being had to the annexed drawings, making part of this specification, in which—

Figure 1:
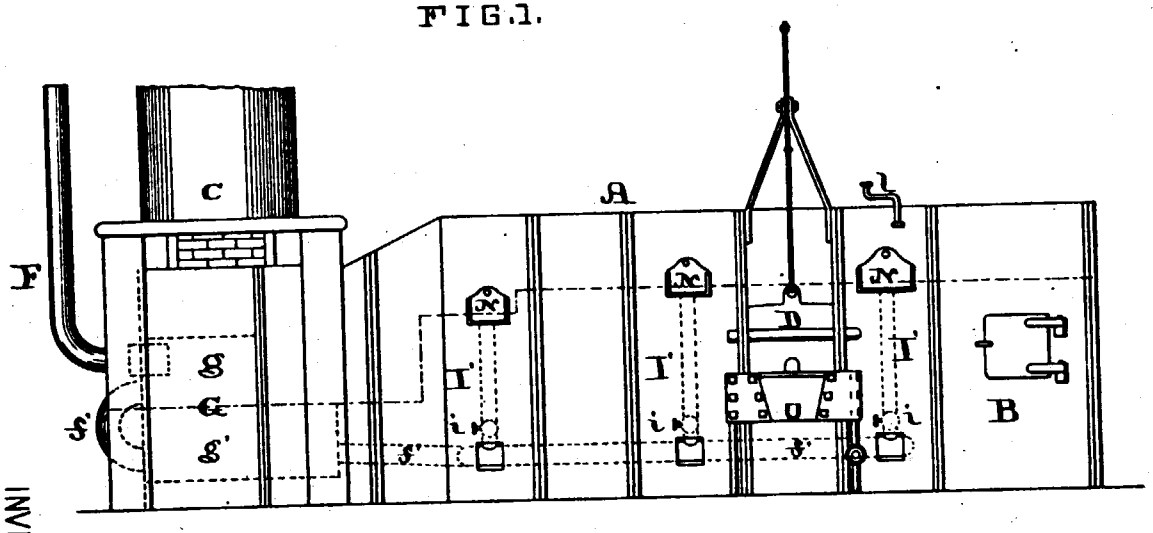
Figure 2:
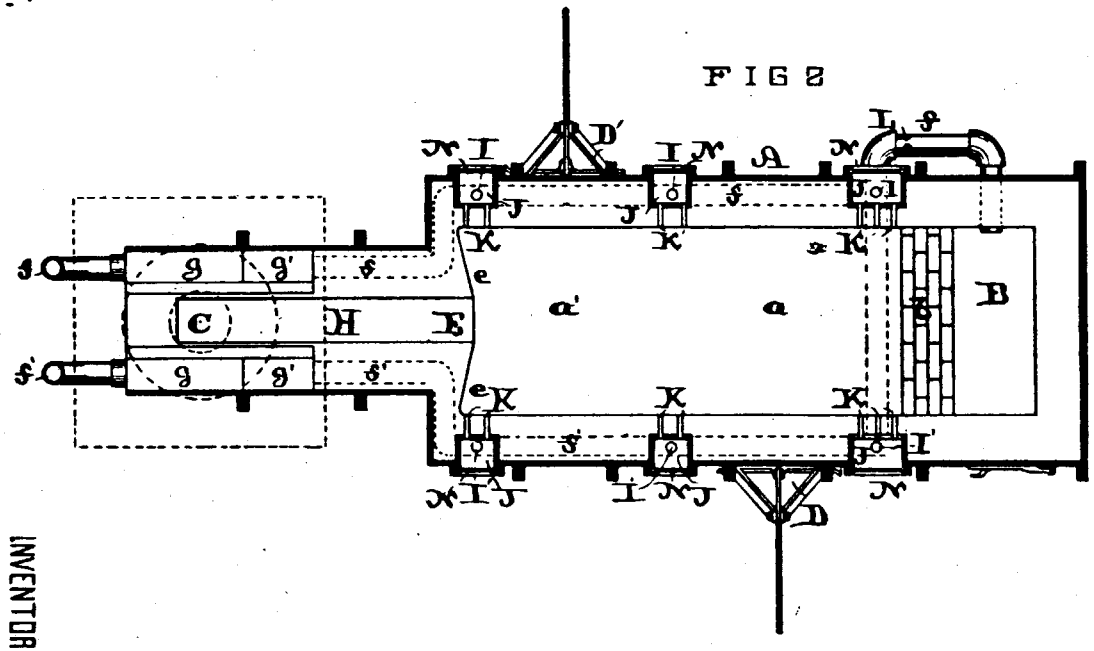
Figure 3:
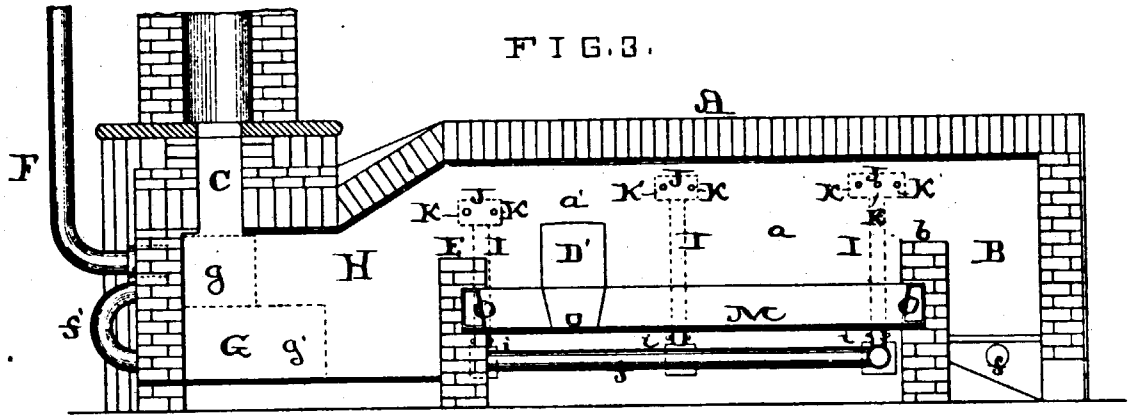

Figure 1 is a side elevation of the furnace; Fig. 2, a horizontal section thereof, taken on different levels, as indicated by the dotted lines in Fig. 1; Fig. 3, a central vertical section; Fig. 4, a plan, being a detail showing the water-boxes; and Fig. 5, an end elevation of the rear end of the furnace.

Like letters refer to like parts.

Our principal aim is to produce puddled iron more economically and of a better quality; and to these ends the invention has relation to the construction of the puddling-chamber of the furnace.

It also has reference to the heating, regulation, and introduction of the hot-air blast.

It further relates to the shape of the neck of the furnace; also to the mode of constructing the water-boxes, and to the provision whereby the openings for the entrance of the air-blast are enabled to be kept open.

Referring to the annexed drawings, A, Figs. 1, 2, and 3, represents the improved furnace. B represents the fire-place; and *a a'* represent a double puddling-chamber—that is, a chamber wherein two different balls can be puddled at the same time; and for this purpose the furnace is made comparatively long and narrow, providing room at *a*, immediately beyond the bridge-wall *b*, where one of the puddling operations can be carried on, and at *a'*, immediately beyond the place *a*, and in the direction of the chimney C, for the other puddling operation.

D D' represent doors arranged respectively on each side of the furnace, and respectively opposite the places *a* and *a'*.

The furnace-walls are built in the usual form, saving at the rear end, E, near the neck of the furnace. The walls, instead of being contracted gradually toward the neck, are carried a uniform distance apart until opposite the neck, and then, in such a direction as to form re-entering angles *e e'*, they are carried to the furnace-neck.

F, Figs. 1, 3, 5, represents an air-blast pipe, which, coming from any suitable direction, is forked into two branches, *f f'*, before entering the furnace. These branch pipes are respectively carried into heating-boxes G G, which are located at the bottom of the chimney C and at the end of the flue H.

We do not desire to be confined to the precise shape and construction of the boxes G G shown. They are made double, *g g'*, to obtain a larger amount of heating-surface; but any suitable form will answer.

From the heating-boxes the branch pipes *f f'*, respectively, along either side of the furnace and as indicated by the dotted lines in Figs. 1 and 2, and as shown in Fig. 3, are conducted toward the forward end of the furnace, and to a point just beyond the bridge-wall *b*, where the two branches are preferably united. One of the branches, *f*, Figs. 2, 3, is then carried out through the furnace-wall, and thence along the same until opposite the ash-pit, where it is taken into the furnace again, and so as to open in the ash-pit beneath the fire-place B.

I I I I' I' I' represent additional branch pipes leading upward from the branches *f f'*, and arranged as follows: three on either side of the furnace and opposite, or thereabout, the following points: the forward end of the chamber *a a'*, the rear end of the chamber *a a'*, and a point midway between the first two named. The pipes I I', &c., are carried up within the walls to the upper part of the furnace, and respectively into chambers J J, &c., arranged in the furnace-walls. The latter are perforated, as shown at K K, &c., Fig. 3, opposite the chambers J J, &c., to enable the blast to enter the furnace.

The pipe I, chamber J, and perforation K in effect constitute a flue, by which the air-blast is enabled to enter the puddling-chamber in a horizontal direction above the level of the metal being puddled, and preferably near the roof of the puddling-chamber.

All the pipes I I', &c., are provided with cut-off valves *i i i i*, &c., and that part of the branch *f* which enters the ash-pit is also furnished with a cut-off, L, operated by a lever, *l*, Fig. 1. The main branch pipes *f f'* are contained in the furnace-walls until they pass the flue-bridge, and they are then carried beneath the furnace-bottom M.

N N, &c., Figs. 1 and 2, represent doors arranged on the outside of the furnace-wall and opposite, respectively, the chambers J J, &c.

O O, Figs. 3 and 4, represent two similar water-boxes arranged upon the furnace-floor, and in the manner indicated in Fig. 4. They are independent of each other, and are suitably supplied with water.

The puddling-chamber is charged in the two places *a* and *a'*, and the furnace is fired in the ordinary way. By reason, however, of the proportions of the furnace and the relative arrangement of the places *a* and *a'* and the fire, the heat is concentrated and economized, and the desired result is produced with a smaller consumption of fuel than has hitherto been used. The process is further cheapened by the improved method of using the hot-air blast, and which also enables a better quality of iron to be produced.

By means of the branch pipes I I', &c., the blast can be admitted, as desired, to any part of the furnace, combustion can be made more complete, and the degree of heat can be suitably modified. In this way the furnace is brought under perfect control, and by reason of this not only the right degree of heat can be maintained, but the furnace, if desired, can be heated differently at different points.

A further important advantage accrues from this control. Hitherto it has been impracticable to always heat a puddling-furnace to the highest degree desirable, for the reason that in so doing a portion of the iron in one part of the furnace might be overheated. With the present improvement a very high degree of heat can be safely maintained at any point without endangering the contents of the furnace elsewhere.

The principal benefit, however, is derived from the introduction of the hot air into the upper part of the puddling-chamber, and in such manner as not to come in contact with the iron being puddled. The air, entering through the perforations K K, passes horizontally into and across the chamber *a a'*, coming in contact with the unconsumed carbon, passing the bridge-wall *b*, and supplying the needed oxygen for its complete combustion, and causing the upper portion of the chamber to become full of heat that is gradually borne down toward the hearth of the chamber, intensifying the heat at that point. The temperature is still further increased from the air being introduced from opposite sides of the furnace and from directly opposite points. The result is that a much higher degree of heat is attainable in the present furnace than in the ordinary furnace, enabling the iron to be puddled at such a degree of heat as to cause the removal from the product of objectionable ingredients which hitherto have remained in ordinary puddled iron.

By reason of the shape of the wall at the neck of the furnace the flame is thrown back into the furnace, and, in consequence, the heat is further economized.

In use, the perforations in the furnace-walls, through which the blast enters from the pipes I I', &c., are apt to be closed from the action of the fire upon the walls and from the collection of incombustible matter. In such condition the doors N N are opened, and by the insertion of a suitable tool the closed apertures are punctured and reopened.

The lower part of the furnace is cooled by means of water circulating through the boxes O O.

By using two boxes entirely independent of each other no trouble arises from the expansion and contraction of the material composing the boxes, which difficulty exists when a single box only, extending around the hearth, is employed.

To increase the fire, the blast is turned in the ash-pit.

Having described our invention, what we claim as new, and desire to secure by Letters Patent, is—

1. The combination of the chamber *a a'*, pipes *f f'*, boxes G G, and pipes I I I I' I' I', substantially as described.

2. The chamber *a a'*, boxes G G, pipes *f f'*, pipes I I', and chambers J J, having the perforations K K and doors N N, combined and operating substantially as described.

3. The combination of the furnace A, pipes I I, and the chambers J J, having the doors N N and the perforations K K, substantially as described.

4. The combination of the furnace A, pipes I I, and chambers J J, having the perforations K K, substantially as described.

5. The combination of the chamber *a a'*, pipes I I, chambers J J, having the perforations K K, and the valves *i i*, substantially as described.

6. The combination, in a puddling-furnace, of the pipe I, chamber J, having the perforation K, substantially as described.

7. The combination of the furnace A and the chamber J, having the perforations K K and door N, substantially as described.

WM. L. REYNOLDS.
DAVID THOMAS.

Witnesses:
CHAS. D. MOODY,
PAUL BAKEWELL.